United States Patent Office 3,108,357
Patented Oct. 29, 1963

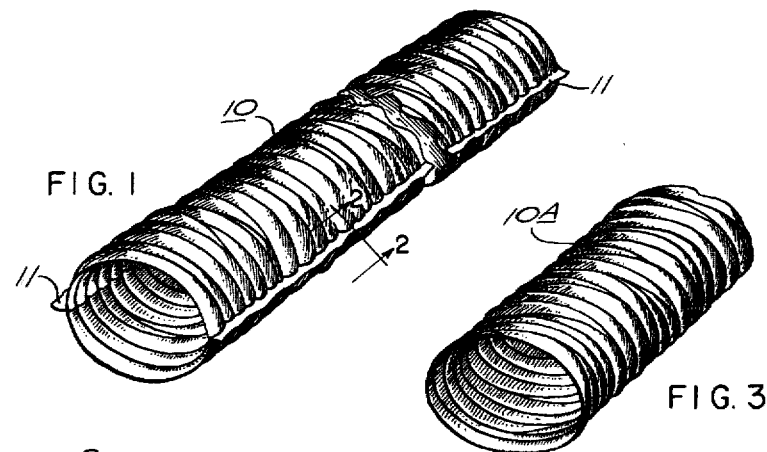
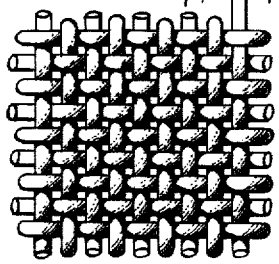
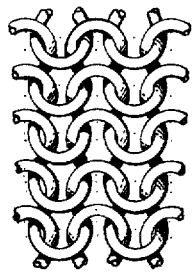
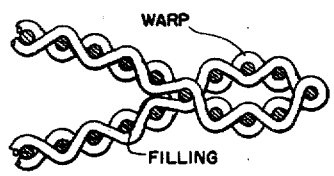
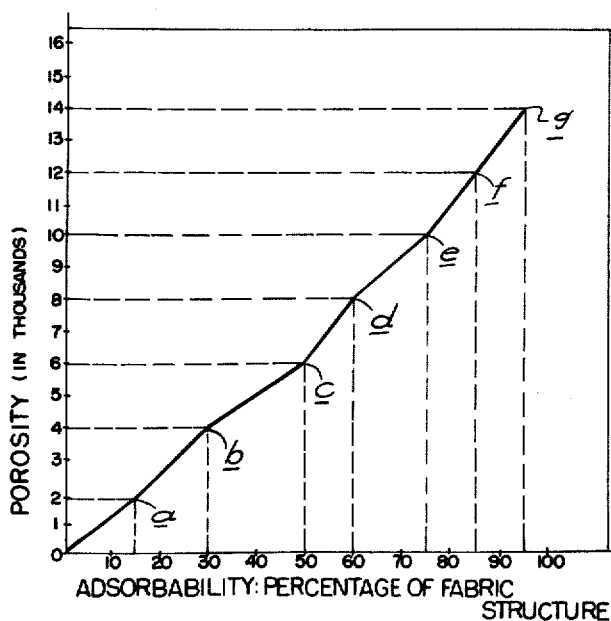
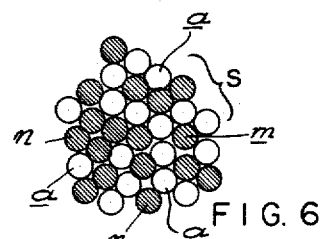
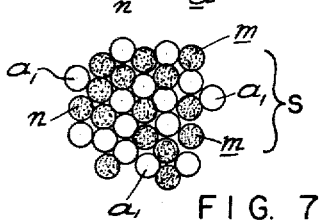

3,108,357
COMPOUND ABSORBABLE PROSTHETIC IMPLANTS, FABRICS AND YARNS THEREFOR
William J. Liebig, Martha Road, Harrington Park, N.J.
Filed June 20, 1962, Ser. No. 203,880
14 Claims. (Cl. 28—76)

My present invention concerns prosthetic materials and devices, including more particularly tubular vascular and other implants for surgical use in human and animal bodies. The general class of devices concerned is illustrated by those of my Patent No. 2,978,787 of April 11, 1961.

It is becoming recognized by surgeons and researchers with respect to animal and human prosthetic means and the behaviour thereof in body implantations that along with considerations of strength, flexibility, and those of a biological nature, especially compatibility to animal tissues and particularly blood, the factor of porosity for the walls of implant devices is of major importance, to such extent that it may be regarded to be a primary determinant of the functioning of synthetic vascular grafts.

For example, substantially non-porous elements such as extruded plastic tubing and metal tubes are definitely unsatisfactory, and if deliberately perforated in an attempt to provide for fibroblastic permeability they are too porous for proper performance at the stage of initial implantation. Likewise, fabricated textile grafts in which all of the strands are of a persisting and non-absorbable or non-resorbable nature are too porous at implant time if fabricated with meshes sufficiently open for subsequent fibroblastic permeability, and if made with sufficient tightness of mesh for avoidance of objectionable leakage during initial blood flow following implantation, then such very low porosity material causes objectionable delay in the organization of biological growth through the interstices of the graft. In general in this connection it will be understood that a synthetic graft is basically a foreign body which the host animal or person tends to encapsulate completely.

Thus the concept has been had that synthetic vascular grafts should have a wall material and structure such as to afford a low porosity on initial implantation and later but within a relatively short time, in a matter of a very few days or even hours, to develop a high porosity adequate for fibroblastic penetration in conjunction with biological healing. That concept is disclosed along with implant structures, materials and components for the embodiment thereof in prosthetic devices in my pending application Serial No. 144,811 filed October 9, 1961 as a continuation of my Serial No. 126,753, filed June 6, 1961 and now abandoned, wherein synthetic vascular grafts are of compound fabrics and strands comprising some components of permanent non-absorbable nature and others with the capacity to be absorbed or resorbed, being of collagen derivative material.

The present invention aims to provide composite fabrics and materials and synthetic implant devices fashioned thereof by textile processes including weaving, knitting and fabricating by the non-woven felting of fibers, in all of which certain absorbable components are incorporated in a manner to afford initial low porosity and after implantation to develop a high porosity as above referred to and to be further described.

In the drawings illustrative of embodiments of the invention:

FIG. 1 shows a length of synthetic tubular implant of absorbable and non-absorbable materials to afford the initial and subsequent different porosities, the materials in this instance woven with longitudinal in-woven seam formations as by Jacquard weaving as disclosed in my Patent 2,978,787;

FIG. 2 is an enlarged partial sectional view of an implant woven as in FIG. 1, being taken at a plural in-woven seam region thereof, as upon the line 2—2;

FIG. 3 shows a short length of a tubular implant of woven, knitted or other seamless construction;

FIG. 4 is an enlarged view of a small area of woven fabric as employed in woven tubular implants of the invention;

FIG. 5 illustrates on a large scale a small area of the implant fabric material of a knitted construction;

FIG. 6 is a further enlarged cross-sectional view of a component strand as for example on the line 6—6 of FIG. 4 or in a wale or course of FIG. 5, in this instance of staple fibrous form;

FIG. 7 is a cross-sectional view like that of FIG. 6 showing another composite strand, in this example of continuous filament form; and FIG. 8 is a fabric porosity graph.

In the mentioned pending application implants are disclosed wherein certain non-permanent strands are composed of animal protein substances, particularly collagen and collagenous matter native in the hide, skin, fascia, muscles and such connective tissues of vertebrates. When employed for implant purposes such material of the grafts is resorbed or absorbed and replaced by tissue and cellular growth, in the attendant biological process. Because that collagenous material is of animal origin the phenomenon of absorption in use is termed "resorption" in such application. By contrast, in accordance with the present invention certain non-permanent or replaceable materials are employed which are not animal derivative yet are found to be dissoluble and replaceable in a highly satisfactory manner in the biological process following implantation. They are referred to herein by the term "absorbable" as distinguished from "resorbable" animal derivative materials that in effect are taken back into the biological environment of the host patient.

Also as in said application porosity is again here expressed with reference to the Wesolowski porosity scale as employed for the porosity tester apparatus or meter of that name. By that system the fabric test piece is clamped flatwise and subjected to a column of water at a constant pressure head of 120 mm. of mercury and readings are obtained which express cubic centimeters or milliliters of water permeating per minute through each square centimeter of fabric. The scale reads in units expressive of such test results ranging from absolute impermeability of zero through the smaller increments and upwardly through the range of 1,000, 2,000, etc., to a value of 20,000 as equivalent to entirely free flow.

From clinical experience it is the present feeling among surgeons that an ideal initial porosity for vascular and such tubular implants is in the region of 50 or less and not greater than about 80 on the Wesolowski scale, i.e., 50 cc. or ml. of water per minute per sq. cm. of graft wall or fabric at 120 mm. Hg. This corresponds to an extremely tight fabric structure, considerably more so than for most tubular prosthetic devices, which generally have a porosity in the neighborhood of 350 or greater on the average, in the initial condition for implantation. Further, in vivo tests in animals indicate that for optimum healing results the graft porosity soon after implantation and during the healing period should so develop as to have what is herein termed a biologic permeability at least equivalent to a water porosity in excess of 2,000 to 2,500 and up to 5,000 or even 10,000 or more cc. or ml. of water per minute per sq. cm. of the graft wall at a pressure head of 120 mm. Hg.

In conjunction with said optimum initial and subsequent porosity capacities it will be understood that the implant material must be nontoxic and non-allergenic, should be capable of enduring in use for prolonged times without dangerous deterioration under biologic implantation, and that when in tubular form the implant devices should have certain physical properties with reference to mechanical handling including pliability together with a self-maintaining capacity to retain or return to an open lumen status despite pinching and twisting, so as to minimize the chance for occurrence of kinks and obstructions in the course of implantation and subsequently.

In keeping with said objects and as a characterizing aspect of the present invention it has been determined that such may be attained by fabricating the implant walls of textile fibers and strands incorporating in certain proportions and at preferred locations an oxidized cellulosic fibrous material.

Oxidized cellulose as such is a known substance or compound which can be so prepared that the cellulose is not broken down or degraded. One process therefor is disclosed for example in U.S. Patent No. 2,232,990 to Yachel et al. wherein modified celluloses have terminal compound atoms of the glucose units of the cellulose tranferred to carboxyl groups. Such oxidized cellulose was found useful for forming photographic films and for sheets or backings therefor; also in the form of cellulose salts use has been indicated as backings and coatings for film and various surfaces or as sizing for textiles.

Subsequent investigation has shown that oxidized cellulose has hemostatic properties, leading to the use of it as the entire constituent substance for fabricated strips and pads for hemostatic purposes in medicine and surgery in a similar manner as ordinary surgical gauze or cotton. Thus for example strips and pads of a highly open mesh gauze consisting entirely of loosely woven strands of oxidized cellulose are supplied commercially, as by Parke, Davis & Company under the trademark Oxycel. Likewise an absorbable hemostat in the form of open mesh loosely knitted fiber strips and carded fiber pads are supplied by Johnson & Johnson under the trademark Surgicel. Such articles consist in toto of oxidized regenerated cellulose derived from alpha cellulose by conversion to viscose in an alkaline organic solvent, then spineretted, filamented and spun into threads which are loosely knitted into an open gauze. The latter is then oxidized by converting a primary alcohol radical into the carboxyl group and the by-products then washed away, leaving the tenuous open mesh material found to be both hemostatic and also absorbable in human and animal tissues with minimum tissue reaction, toxicity, intolerance or sensitivity.

The present invention avails of the hemostatic and absorbability properties of oxidized cellulose for the fabrication of prosthetic implants constructed to have an initial low porosity but with capacity to develop after implantation a high biologic permeability as above referred to.

In some instances in the practice of the invention pure cotton fibers have been utilized for subjection to the oxidizing treatment, in lieu of alpha or other cellulose fibers otherwise obtained. Under the presently preferred practices the oxidizing of the cellulose constituent, whether the viscose or the cotton, is effected after fabrication of the wall structure of the implant device and after the tubular devices are given final form including certain "micro-crimping" such as shown in the examples of FIGS. 1 and 3 and as fully disclosed in my earlier and copending application Serial No. 775,522 Patent No. 3,096,560, granted July 9, 1963.

The term "oxidized cellulose" as generally employed herein is to be understood as applying either and both to the product of oxidation of a natural cellulose such for example as cotton and cotton linters and including particularly long-staple or Egyptian cotton, and also to the product of oxidation of synthetic cellulose such as viscose and regenerated cellulose as present in man-made textile fibers and filaments such as rayon. Where the latter is specifically intended the expression "oxidized regenerated cellulose" is used.

The structural formulas for cellulose and oxidized cellulose have been represented in the following manner:

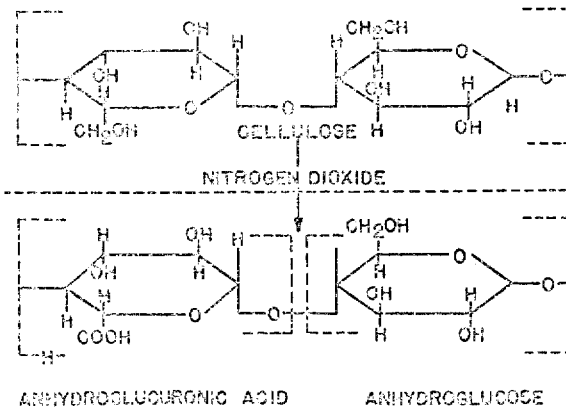

The above oxidized compound has been shown to be a copolymer of anhydroglucose and anhydroglucuronic acid which, on more extensive oxidation, becomes polyanhydroglucuronic acid. Properly prepared as under oxidizing by nitrogen dioxide and washing away of all oxide of nitrogen the oxidized cellulose product maintains its original form and much of its original strength.

In accordance with the invention the ultimately oxidized cellulose fibers, filaments and strands may be incorporated into the implant wall fabric and the tubular implant devices formed by such fabric by various textile methods, so long as the primary object of an initially relatively impermeable but subsequently, after implantation, highly porous wall is satisfied. In this regard it is to be noted that the utilization of oxidized cellulose has important advantages as contrasted with resorbable collagenous material as concerned in the prior application mentioned. The animal-derivative collagen is relatively expensive, is subject to limitation in supply and requires painstaking care in the sterile preparation thereof. More importantly, it is relatively difficult to fashion into textile fibrous form, particularly in small diameters as versus a coarser and generally monofilament form. Resultantly the tubular devices fashioned with such collagen as a component are less readily made with initial tight mesh, and after implantation the resorption while affording increased porosity does so with the creation of relatively large voids and interstices.

By contrast, under the present invention, the cellulose fiber material to be oxidized can be made available in fine deniers composed of multi-filament strands and also in staple fibrous form, whereby the implant wall fabric can be fashioned to give an equal or even greater gain in overall porosity but which is accomplished by means of the development of a greater number of smaller interstices more or less uniformly distributed throughout the entire wall areas as versus a small number of larger openings. Hence the examples of the accompanying drawings include implant fabrics and tubular devices fashioned by knitting as well as by a number of types of weaving, the invention also contemplating fabrication of webs and tubes of a felted, matted or non-woven structure, such as produced by the carding of fibers and superposing thereof in crossing and compressed interconnective relation such as in the fabrication of paper tissues and like self-supporting non-woven fabrics, the same being for the purposes of this invention laid so as to present a circumferentially continuous tubular structure.

A further distinct advantage under the present invention and the methods thereof lies in the fact that the step of oxidizing the cellulosic content of the fabric of the formed tubular implants is accompanied by a shrinkage of the implant of approximately 25 percent dimensionally. Thus as later pointed out in greater detail an implant formed with 10 mm. diameter before oxidizing presents after oxidizing a reduced diameter of 8 mm. This fact further contributes to the desired initial low porosity or substantial impermeability for the implants.

In FIG. 1 a length of a surgical implant or prosthetic device is designated as a unit by the numeral 10. It is shown as a tubularly woven circumferentially continuous fabric, in this instance made by a Jacquard weaving process in a manner to provide lengthwise thereof in the direction of the filling the closed in-woven seam formations 11, 11, as in my said Patent 2,978,787. In this instance the warp is circumferential of the implant tubing.

Similarly in FIG. 3 is illustrated a short length of a tubular implant 10A fashioned by any of several available circumferentially continuous textile processes. These include weaving as upon a narrow-fabric loom in a manner as illustrated for example in a patent to Goldsmith 2,250,261, or by other manner of so-called circular weaving, for instance as in De Ghetto Patent 2,364,276. In these examples of weaving the warp elements generally extend lengthwise of the fabric tubing and the filling is circumferential. The tubular seamless implant of FIG. 3 also is representative of the circularly knit fabrication, wherein the knitting wales are lengthwise of the tube. It likewise is intended as representative also of the alternative non-woven or felted fabrication as above described.

In any of such fabricated tubular forms of the implants of the invention it is now deemed preferable that the strands containing absorbable cellulosic material in accordance with the present invention be disposed in both the circumferential direction and in the longitudinal direction. This will permit absorption to occur for example in both warp or filling yarns when these yarns are the components of fabrics formed into implants which are put to the ultimate surgical use. While in the broadloom example of FIGS. 1 and 2 the absorbable cellulosic material is utilized as a component of the threads or yarn marked "filling" in said FIG. 2, it will be understood that the yarns containing the absorbable cellulosic material may be employed in either the warp or the filling, or both, of woven tubular forms of the implants of the invention. Thus for example where the tubular fabric device as represented by FIG. 3 is fabricated by weaving, with the warp extending lengthwise and the filling circumferentially of the tubing, said absorbable oxidized cellulosic material may be present in both the warp and the filling components. And in the devices of FIGS. 1 and 2 woven by the broadloom method under Jacquard control, as in the manner of said Liebig Patent 2,978,787, when the oxidized cellulose content is incorporated mainly or wholly in the filling, it may be presented either in staple fibrous form or in the form of continuous multifilament strands, such for example as in the strand section enlargements of FIGS. 6 and 7 respectively. The same applies also to the fabric structure represented by FIG. 3.

Such composite strand S in the example of FIG. 6 represents a yarn or thread formed of a blend of absorbable and non-absorbable staple fibers or cut filaments in the proportion of approximately or exactly 50 percent of each. These may be a polyester, particularly Dacron or other of the synthetic fibers suitable for prosthetic implant purposes, such as nylon, Orlon or Teflon recited in my Patent No. 2,978,787 as having thermal stability to withstand sterilization by the usual autoclaving process and being otherwise suited to implant usage including strength, flexibility, resistance and especially compatability to human tissue and wettability for blood.

Such non-absorbable synthetic fiber is represented in FIG. 6 by the hatched fiber cross-sections $n$. There for example said non-absorbable fibers $n$ may be the terephthalic acid-ethylene glycol ester as supplied by Du Pont de Nemours Co. under the trademark Dacron, or others of the fibers noted. Blended therewith are the absorbable fibers indicated in FIG. 6 by the clear cross-sections $a$, which latter may be natural, preferably long staple, cotton as the oxidizable cellulosic element or specifically oxidized viscose or regenerated cellulose such as known in the manufacture of rayon. Similarly in FIG. 7, illustrating a continuous multifilament form of yarn or strand the absorbable oxidizable cellulosic components are represented at $a^1$ and the non-absorbable components by the hatched cross-sections $n$, these again being of any of said non-cellulosic fibers or filaments already mentioned.

The degree of potential or terminal porosity after implantation is controllable by ordering of the number and arrangement of the non-absorbable and absorbable strands in the yarn used to form the wall fabric of the tubings. Thus in the various fabrics the proportionate content of absorbable material by volume in the total fabric structure including all those strands in which it is used, i.e., in the filling or in the warp or in both, may range from about 15 percent to as much as 95 percent, the remaining components being of the non-absorbable composition.

Ultimate or terminal porosity for the fabrics as here concerned is determinable by chemically dissolving out the absorbable content of the fabric, or of the implant formed thereof. Such total chemical removal of the absorbable content takes place at a faster rate than under biochemical action in an animal or human body and is not attended with simultaneous replacement by fibroblasts and other tissue growth as occurs in actual use as a surgical implant. Therefore the terminal porosity values as measured following such chemical treatment substantially exceed the actual porosity change as occurs in prosthetic use in vivos, thereby affording a large margin of safety.

The porosity values indicated on the graph, FIG. 8, are those as represented by such chemical dissolving out of the absorbable content.

Thus by way of example the number and arrangement of the filling elements having an absorbable content, when woven by the broadloom method as in FIGS. 1 and 2, may be varied from a minority of the absorbable strands or elements to a predominant majority thereof similarly as more fully detailed in my copending application Serial No. 144,811, in connection with the sectional fabric diagrams FIGS. 3 to 9 therein, giving ultimate porosity results as indicated in FIG. 8 hereof whereon the lettered points of the curve represent the corresponding percentages of absorbable component in the total fabric, under whatever manner of fabrication thereof as disclosed herein.

In one exemplary fabric, selected to be toward the lower end of the available terminal porosity range, the strands with absorbable components are utilized in the filling, in the case of broadloom weaving, or in the warp or filling or both in the case of narrow loom or circular weaving, in the ratio to give in the fabric structure a total absorbable content by volume of approximately 15 percent. Depending further on the size of the strands, as for example 70 denier Dacron yarn for the non-absorbable elements and approximately the same size for the other and absorbable elements such fabric is found under the Wesolowski test to have the initial low porosity value of 50 to 70, i.e., passage of 70 cc. of water per minute per sq. cm. of fabric at 120 mm. Hg. It is further understood that the weaving of these fabrics, upon whatever type of loom, is carried out with the maximum number of warp ends and the maximum picks available on the given loom. In the present example the described fabric following full chemical dissolution of the absorbable elements shows a terminal porosity value of 1790 by the Wesolowski measurement, in other words an increase in porosity of approximately 25 times from the initial value; see point $a$ of FIG. 8.

Other examples of fabric tubings of the invention, whether woven, knitted or otherwise circularly formed, include various increased percentages of the absorbable component in the total fabric structure. Thus, considering for instance a narrow-fabric or a circular weaving method wherein the absorbable component is employed in the warp and in the filling, by utilizing absorbable strands in the overall ratio of 1:2, of absorbable to non-absorbable content, in other words presenting an absorbable content of approximately 30 percent, the tubular implants so constructed possess initial porosities ranging from below 50 to about 150 on the Wesolowski scale and a terminal porosity of about 4,000, noting point $b$ of the graph, FIG. 8.

Similarly, in the direction of increased absorbability content, where the tubular fabric is formed with the strands or yarns having the absorbable component utilized in the overall ratio of 1:1 and so as to give a 50 percent content of absorbable oxidized cellulose by volume, there results a maximum initial Wesolowski porosity of not over about 100 and a terminal porosity of approximately 6,000; see point $c$ of the graph, FIG. 8.

Further increase in the proportion of the absorbable oxidized cellulose content to a ratio in the fabric of 2:1 or about 60 percent absorbable material, again with maximum density available for the particular manner of fabrication, gives an initial porosity value averaging 50 to 60 on the Wesolowski scale and a terminal porosity value of 8,000 or more, an increase of nearly 150 times, noting point $d$ of FIG. 8. On the basis of tests in animals tubular woven vascular implants according to this example appear to approach the optimum for the majority of cases under present experience to date.

If found desirable, still higher percentages of absorbable components may be utilized as for example in the ratio of 3:1 of absorbable components to the other, giving in the fabric as a whole about 75 percent of absorbable oxidizable cellulosic content, there is obtained an initial porosity value of about 130 maximum and terminal porosity of about 10,000. Still further increase in the ratio of absorbable to non-absorbable, similarly as detailed for example in connection with FIGS. 8 and 9 of the mentioned application, afford terminal porosity values of substantially 12,000 and 14,000 respectively.

With reference to the foregoing examples it will be understood as earlier pointed out that the absorbable elements may be in continuous filament form, generally multi-filament, or in staple fibrous form. In either case those yarns which are to be at least in part absorbable may have varying percentages of the oxidizable cellulosic material here concerned, such as the viscose or the cotton, and the balance non-absorbable, such as the Dacron or other synthetic composition as earlier mentioned and as described with reference to FIGS. 6 and 7.

Thus in the mentioned examples the porosity values stated are for fabrics having as the absorbable components yarns composed of the oxidizable cellulose material and non-absorbable material in filament or fibrous form such as those of said FIGS. 6 and 7. For instance, in FIG. 6, intended as representative of a staple fibrous yarn, some 34 individual components are illustrated comprising 17 of the non-absorbable units $n$ shown hatched and 17 of the absorbable units $a$ shown clear. In such case of equal quantities of the two components the total absorbable volume is substantially one-half that for a yarn of the like cross-sectional area but formed wholly of absorbable components. This relation as to absorptivity, and the rate thereof, depends somewhat on the arrangement of the respective units in the strand, i.e., as to whether there is more or less of a core of one or the other composition, absorbable or non-absorbable, with the opposite variety distributed about it. It is preferred that the relative distribution be more or less equalized between the two materials as to external and internal positions in the yarn or total strand and so that the voids formed by dissolution of the absorbable units are interspersed through and individually located in the total composite strand or yarn to provide a maximum or at least a relatively large number of smaller voids or interstices, in the general manner as illustrated, rather than a lesser number of larger ones. The same applies also to the yarn or strand as illustrated in FIG. 7 comprising a composition of some 15 of the non-absorbable polyester or other units $n$, shown stippled, and 15 of the oxidized regenerated cellulosic filaments $a^1$ shown clear.

Excellent results also have been obtained by fabricating the tubular walls of the implants by circular knitting, employing fine strands of the composite type such as those of FIG. 6 or 7 and utilizing a knitting stitch affording maximum tightness and fineness of mesh for low initial porosity. This has been accomplished for example upon a seamless hosiery knitting machine, specifically a Lombardi machine of Scott & Williams manufacture, forming a tubular knit fabric presenting a scoured count of approximately 47 wales by 63 courses per sq. in. This has been accomplished with composite yarns such as typified in FIGS. 6 and 7. One such tubular knit fabric is formed by using a composite yarn composed of 34 filament 70 denier Dacron yarn of zero twist combined with 30 filament 75 denier regenerated cellulose or viscose rayon of minimum twist such as two and one-half turns as occurring in the extrusion, and utilizing the finest gage of needles. It gives the scoured count as above mentioned.

As earlier explained the woven, knitted or other fabricated tubing of the implants, after scouring, is subjected to "Micro-crimping" to the minutely and closely pleated form as represented in FIGS. 1 and 3 and as more fully disclosed in my prior application mentioned. Thereafter the formed implants are subjected to the oxidizing treatment in accordance with the invention and whereby the natural or the synthetic cellulosic content, such as the cotton or the rayon viscose mentioned, is modified to convert it to a carboxyl content in which the CO(OH) is toward the upper end of the range available. It is recognized that oxidized cellulose for best hemostatic properties desirably has a carboxyl content in the range of 16 to 22. The oxidized material is more absorbable as the higher carboxyl figure (22) is approached. A maximum degree of oxidation without degeneration of the cellulose content is desirable in all of the implant examples, whether woven, knitted or otherwise circularly formed, to permit rapid absorbability and consequently better biologic healing. In the proper performance of the oxidizing process and as for example as explained for the preparing of oxy-cellulose in said Yachel Patent 2,232,-990, there is no deleterious effect as regards implant purposes upon the polyester, or other of the nonabsorbable components of the fabricated devices. It is again here noted that oxidizing produces up to 25 percent shrinkage in fabric construction, adding to the initial low porosity for the implants.

By way of specific example, a tubularly woven broadloom implant having a 10 mm. inflated diameter and utilizing a standard 70 denier Dacron warp with a filling of 50 percent polyester staple, in this case Kodel, and 50 percent long staple Egyptian cotton blended to a No. 60 single and woven with a count of 150 warp ends by 80 filling picks per sq. in. presented upon oxidizing an 8 mm. inflated diameter and a carboxyl value or rate for the cellulose of 18.4 to 19.4, i.e., medially within the desired 16 to 22 carboxyl range for hemostatic purposes. Said woven implant had a low initial porosity of not over 65 and an ultimate porosity following chemical digestion equalling 2780 on the Wesolowski scale, the oxidized cellulose content being 21.8 percent by weight.

From the foregoing description in connection with the drawings and the stated examples it will be apparent that the invention affords prosthetic devices and particularly tubular vascular implants affording in controlled and highly satisfactory degree the capacity of initial low porosity so approaching impermeability as to withstand the initial flow of blood and fluid under the primary surge thereof following implantation and coupled with a capacity to acquire porosity at a rapid rate beginning soon after implantation, through the working of the biologic processes of the host body. The implants according to the present invention thus enable the start of the fibrin and attendant tissue growths to occur quickly and to continue rapidly through the critical initial period of one to three days following implantation, it being understood that the entire process of absorption and resorption may take place over a longer total period.

Utilization of the oxidized cellulose content as above explained is particularly advantageous in that it enables the use of a finer fiber as contrasted with that heretofore available. As noted the individual cotton or viscose fibers are extremely fine and utilization thereof in accordance with the invention provides for the implant walls many and smaller openings in widely dispersed array and spread about throughout the entire fabric but having the multiplicity of supporting fibers all around them. Thus there is a substantial cutting down of the larger size interstices giving the implant walls a gossamer fabric structure but attendantly with a total aperturing or porosity equivalent to or surpassing that of prior devices. In this manner the healing pattern under the attendant biologic processes appears to be more easily and satisfactorily accomplished in the host patient.

It will be understood that my invention, either as to means or method, is not limited to the exemplary embodiments or steps herein illustrated or described, and I set forth its scope in my following claims:

I claim:
1. A prosthetic tubular graft for surgical implantation in animals and humans, comprising a flexible fabric tube having the wall thereof formed of interlaced textile strands some of which contain components consisting of oxidized cellulose absorbable by biologic processes in a host patient, the remainder of the fabric wall being of non-absorbable tissue-compatible composition.

2. A prosthetic tubular graft according to claim 1 wherein the fabric tube is woven and the strands containing oxidized cellulose extend in the direction circumferential of the tube.

3. A prosthetic tubular graft according to claim 1 wherein the fabric tube is woven upon a broadloom under Jacquard control and the strands containing oxidized cellulose are present in the filling.

4. A prosthetic tubular graft according to claim 1 wherein the fabric tube is woven upon a tubular fabric loom such as narrow-fabric and circular looms and the strands containing oxidized cellulose are present in the filling and in the warp.

5. A prosthetic tubular graft according to claim 1 wherein the textile strands are of continuous multi-filament form with some of the filaments consisting of oxidized regenerated cellulose.

6. A prosthetic tubular graft according to claim 1 wherein the textile strands are of staple fibrous form with some of the fibers consisting of the oxidized cellulose.

7. A prosthetic tubular graft for surgical implantation in animals and humans, comprising a flexible fabric tube circularly knit and containing in the knitted fabric structure thereof a proportion of textile strands composed at least in part of oxidized cellulose, the remainder of the knitted fabric being of non-absorbable tissue-compatible composition.

8. A prosthetic tubular graft according to claim 7 in which the yarn strands are of continuous multi-filament form wherein some of the filaments consist of oxidized regenerated cellulose.

9. A prosthetic tubular graft according to claim 7 wherein yarn strands are of staple fibrous form with at least a proportion of the filaments consisting of the oxidized cellulose.

10. A prosthetic tubular graft for surgical implantation in animals and humans, comprising a flexible fabric tube having the wall thereof formed of a non-woven self-supporting web of carded fibers suspended in crossing and compressed interconnective relation, a proportion of which are of an oxidized cellulose composition and the remainder are of a non-absorbable tissue-compatible substance.

11. In the manufacture of tubular vascular implants, the process comprising the steps of fashioning a circumferentially continuous fabric tube by interlacing tissue-compatible textile strands to form a longitudinally extensive flexible cylindrical wall of minimal initial porosity, some of said strands being at least in part of an oxidizable cellulosic composition, and after fabrication of such tube subjecting the same to controlled oxidation for converting the basic cellulose molecules into oxidized cellulose of high hemostatic capacity and readily absorbable in human and animal tissues.

12. The process of claim 11 wherein following fabrication and scouring before oxidation the fabric tube is installed on a mandrel and is accorded a "Micro-crimping" action in the presence of heat and moisture for providing along the fabric wall a multitude of closely contiguous circumferential pleats importing self-maintaining patency for the tube lumen.

13. The process of claim 11 wherein the oxidation is by conversion of a primary alcohol radical of the cellulose into the carboxyl group, with by-products of such reaction being then removed by washing.

14. The process of claim 11 wherein the cellulose is oxidized by nitrogen dioxide to produce a compound which is a copolymer of anhydroglucose and anhydroglucuronic acid and which on further oxidation becomes polyanhydroglucuronic acid.

References Cited in the file of this patent

UNITED STATES PATENTS

| | | |
|---|---|---|
| 2,836,181 | Tapp | May 27, 1958 |
| 2,978,787 | Liebig | Apr. 11, 1961 |

UNITED STATES PATENT OFFICE
CERTIFICATE OF CORRECTION

Patent No. 3,108,357                                                 October 29, 1963

William J. Liebig

It is hereby certified that error appears in the above numbered patent requiring correction and that the said Letters Patent should read as corrected below.

Column 10, line 22, for "suspended" read -- superposed --.

Signed and sealed this 14th day of April 1964.

(SEAL)
Attest:
ERNEST W. SWIDER

Attesting Officer

EDWARD J. BRENNER

Commissioner of Patents